United States Patent
Nakao et al.

(10) Patent No.: US 8,679,468 B2
(45) Date of Patent: Mar. 25, 2014

(54) DEOXIDIZING MULTILAYERED BODY

(75) Inventors: Kimitaka Nakao, Chiba (JP); Emiko Yokose, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/060,644

(22) PCT Filed: Aug. 26, 2009

(86) PCT No.: PCT/JP2009/004129
§ 371 (c)(1),
(2), (4) Date: Apr. 1, 2011

(87) PCT Pub. No.: WO2010/023899
PCT Pub. Date: Mar. 4, 2010

(65) Prior Publication Data
US 2011/0171074 A1    Jul. 14, 2011

(30) Foreign Application Priority Data

Aug. 26, 2008 (JP) ................. 2008-216736
Apr. 3, 2009 (JP) ................. 2009-091034

(51) Int. Cl.
*A61L 9/015* (2006.01)
*A01N 59/16* (2006.01)

(52) U.S. Cl.
USPC ........................................ 424/76.2; 424/641

(58) Field of Classification Search
USPC ................ 422/1, 6, 28, 40–41; 424/76.2, 641
See application file for complete search history.

(56) References Cited

U.S. PATENT DOCUMENTS

| | | | |
|---|---|---|---|
| 5,346,644 A | 9/1994 | Speer et al. | |
| 5,603,928 A * | 2/1997 | Noda | 424/76.2 |
| 6,057,013 A | 5/2000 | Ching et al. | |
| 2005/0079306 A1 | 4/2005 | Koyama et al. | |
| 2005/0135963 A1* | 6/2005 | Rodriguez et al. | 422/20 |

FOREIGN PATENT DOCUMENTS

| | | | | |
|---|---|---|---|---|
| JP | 55-090535 A | 7/1980 | | |
| JP | 05-115776 A | 5/1993 | | |
| JP | 05-247276 A | 9/1993 | | |
| JP | 06-100042 A | 4/1994 | | |
| JP | 07-067594 | * 3/1995 | ............... A23L 3/00 |
| JP | 07-067594 A | 3/1995 | | |
| JP | 08-324649 A | 12/1996 | | |

(Continued)

OTHER PUBLICATIONS

English translation of the "Detailed Description" section of JP 07-067594.*

*Primary Examiner* — Monzer R Chorbaji
(74) *Attorney, Agent, or Firm* — Sughrue Mion, PLLC (57) ABSTRACT

The present invention provides a deoxidizing multilayered body, which sufficiently suppresses the production of odorous organic components produced with oxidation, and which absorbs oxygen at a fast rate. The present invention is the deoxidizing multilayered body that is constituted by laminating at least an isolation layer (A) that contains a thermoplastic resin, an odor absorption layer (B), which is made from an odor absorbent resin composition (b) that contains an oxidizable thermoplastic resin, a transition metal catalyst, and an odor absorbent, an oxygen absorption layer (C), which is made from an oxygen absorbent resin composition (c) that contains an oxidizable thermoplastic resin and a transition metal catalyst, and an oxygen barrier layer (D), which contains an oxygen barrier substance, in this order.

13 Claims, 2 Drawing Sheets

(56) References Cited

FOREIGN PATENT DOCUMENTS

| | | | |
|---|---|---|---|
| JP | 09-291120 A | 11/1997 | |
| JP | 10-114371 A | 5/1998 | |
| JP | 10-120913 A | 5/1998 | |
| JP | 2837057 B2 | 12/1998 | |
| JP | 2991437 B2 | 12/1999 | |
| JP | 2000-506087 A | 5/2000 | |
| JP | 3183704 B2 | 7/2001 | |
| JP | 3183704 B2 | 9/2001 | |
| JP | 3306071 B2 | 7/2002 | |
| JP | 2005-137601 A | 6/2005 | |
| JP | 2007-204892 A | 8/2007 | |
| JP | 2008-81529 A | 10/2008 | |
| WO | 2008/081593 A1 | 7/2008 | |

* cited by examiner

DEOXIDIZING MULTILAYERED BODY

This application is a National Stage of International Application No. PCT/JP2009/004129, filed on Aug. 26, 2009, which claims priority from Japanese Patent Application No. 2008-216736, filed on Aug. 26, 2008, and Japanese Patent Application No. 2009-091034 filed on Apr. 3, 2009, the contents of all of which are incorporated herein by reference in their entirety.

TECHNICAL FIELD

The present invention relates to a deoxidizing multilayered body. The deoxidizing multilayered body of the present invention can be used for part or whole of a deoxidizing container, sheet, or film.

In the present specification, the term "deoxidize" means that the oxygen concentration becomes 0.1 vol % or less under a sealed environment and the term "deoxidizer" means a chemical agent, a material, and the like which are used for the purpose of achieving a deoxidized state. Further, the term "deoxidizing" has the same meaning as the expression "has a function of a deoxidizer." Still further, the term "oxygen absorb" means that the chemical agent, material, and the like take in the oxygen contained in the environment regardless of the reached oxygen concentration.

BACKGROUND ART

For the purpose of preserving for a long period of time the various products that are prone to deteriorate or degrade under the influence of oxygen, and that are represented by food products, beverages, pharmaceuticals, medical products, cosmetics, metal products, and electronic products by preventing their oxidation by oxygen, a deoxidizer which eliminates oxygen contained in a packaging container or a packaging bag storing such products has been used. The shape which has been developed at early stage and still used commonly as the deoxidizer is a shape in which a deoxidizer consisted of powdery or granular iron powder, or ascorbic acid, or the like is filled in a air-permeable sachet.

In recent years, a film type deoxidizer having good handleability, wide application range, and very little possibility of accidental ingestion is also being used. With respect to the film type deoxidizer, various suggestions have been made in terms of an oxygen absorbent composition and a film constitution. A basic deoxidizing multilayered body, that is obtained by adding a deoxidizer like iron powder or ascorbic acid to a resin, molding the resin into a film, a sheet, or the like, laminating an isolation layer having heat sealability on one side, and laminating a gas barrier layer on the other side, is known (Patent Document 1). Further, a packaging film containing a layer made from oxidizable organic components or resin components and a transition metal catalyst is also known (Patent Documents 2 and 3). Further, for the purpose of suppressing odor produced by a deoxidizer consisted of an organic material with the oxidation, including an adsorbent like zeolite, etc. in an oxygen absorbent composition, preparing a deoxidizing multilayered film which is obtained by laminating layers containing an adsorbent, or preparing a deoxidizing multilayered film which is obtained by laminating layers containing a base as a neutralizing agent of an acidic gas, that is a cause of odor has been suggested (Patent Documents 4 to 6).

Further, with respect to an agent of eliminating aldehyde-based gas as a cause of unusual smell, an amine compound, a hydrazide compound, a hydrazine compound or a hydrazine derivative supported on an inorganic material is known mainly for the purpose of the elimination of tobacco smell and a counter measure against a sick building syndrome (Patent Documents 7 and 8).

PRIOR ART DOCUMENTS

Patent Documents

Patent Document 1: Japanese Patent Application Laid-Open (JP-A) No. 55-90535
Patent Document 2: Japanese Patent Application Publication (JP-B) No. 2991437
Patent Document 3: JP-B No. 3183704
Patent Document 4: JP-A No. 05-247276
Patent Document 5: JP-A No. 06-100042
Patent Document 6: JP-B No. 3306071
Patent Document 7: JP-B No. 2837057
Patent Document 8: JP-A No. 2007-204892

SUMMARY OF THE INVENTION

Problems to be Solved by the Invention

The present inventors found the followings.
Specifically, as described above, the deoxidizing multilayered film which contains an oxygen absorption layer made of oxidizable organic components or resin components and a metal catalyst is problematic in that odorous organic components are produced with oxidation of the organic components or the resin components during deoxidization process. In particular, when the deoxidizing multilayered film is used for packaging of a food product, flavor of the food product is impaired even by production of weak odor, yielding a significant problem of lowering the value of the food product.

Accordingly, an object of the present invention is to provide a deoxidizing multilayered body, which suppresses the production of odorous components produced with oxidation, and which can absorb oxygen at a practically sufficient rate.

Means for Solving the Problems

The present inventors conducted a research on a deoxidizing multilayered body, and as a result found that by laminating an odor absorption layer containing an odor absorbent and an oxygen absorption layer, and laminating at the same time an isolation layer on the odor absorption layer side and an oxygen barrier layer side on the oxygen absorption layer, a deoxidizing multilayered body which suppresses the production of odorous organic components produced with oxidation and can absorb oxygen at a practically sufficient rate is obtained, and accomplished the present invention.

Specifically, the present invention is a deoxidizing multilayered body constituted by laminating at least an isolation layer (A) that contains a thermoplastic resin, an odor absorption layer (B), which is made from an odor absorbent resin composition (b) that contains an oxidizable thermoplastic resin, a transition metal catalyst, and an odor absorbent, an oxygen absorption layer (C), which is made from an oxygen absorbent resin composition (c) that contains an oxidizable thermoplastic resin and a transition metal catalyst, and an oxygen barrier layer (D), which contains an oxygen barrier substance, in this order.

Further, in the deoxidizing multilayered body of the present invention, the isolation layer (A) is preferably an acidic gas absorbent isolation layer (Aa), which is made from an acidic gas absorbent resin composition (a) that contains an acidic gas absorbent and a thermoplastic resin.

The odor absorbent used in the present invention preferably contains a hydrazine derivative, a urea derivative, or a guanidine derivative, and particularly preferably, it is constituted by having a hydrazine derivative, a urea derivative, or a guanidine derivative supported on a carrier.

Further, it is preferable that the hydrazine derivative is an aminoguanidine derivative and/or a hydrazine double salt.

The acidic gas absorbent used in the present invention is preferably a base compound, and particularly preferably magnesium oxide.

The deoxidizing multilayered body of the present invention may further contain a photoinitiator in the odor absorbent resin composition (b) and/or the oxygen absorbent resin composition (c).

In the deoxidizing multilayered body of the present invention, it is preferable that the oxygen absorbent resin composition (c) further contains at least one component selected from a group consisting of a photoinitiator, another thermoplastic resin that is different from the oxidizable thermoplastic resin, and an additive, and the total compounding ratio of the oxidizable thermoplastic resin, the transition metal catalyst, and the above component is 100% by mass in the oxygen absorbent resin composition (c).

Further, the present invention relates to a deoxidizing packaging container having, at least in a part thereof, which is constituted by placing the isolation layer (A) on the inside of the container.

Effects of the Invention

According to the present invention, with the deoxidizing multilayered body in which a layer made from an oxygen absorbent resin composition containing an oxidizable thermoplastic resin and a transition metal catalyst is laminated, the problem of odor produced during the process of absorbing oxygen is solved without impairing the oxygen absorption capability of the composition.

MODE FOR CARRYING OUT THE INVENTION

An oxygen absorbent resin composition containing an oxidizable thermoplastic resin and a transition metal catalyst produces odorous organic components as a by-product during its oxidation process. Accordingly, a deoxidizing multilayered body constituted by three layers of an isolation layer, an oxygen absorption layer, and an oxygen barrier layer in which the oxygen absorbent resin composition containing an oxidizable thermoplastic resin and a transition metal catalyst is used in the oxygen absorption layer has a problem of by-production of odorous components. To solve this problem, the present inventors conducted various studies as described below, and as a result accomplished the present invention, which is the best mode.

According to the above multilayered body, if a thermoplastic resin layer containing an odor absorbent (odor absorption layer) is laminated between the oxygen absorption layer and the isolation layer, it was possible to suppress the diffusion of the odorous organic components, which are produced from the oxygen absorption layer, towards the isolation layer side. However, since the odor absorption layer acts as resistance to oxygen permeation, the oxygen absorption rate was decreased.

Meanwhile, when an odor absorbent is included in the oxygen absorbent resin composition containing an oxidizable thermoplastic resin and a transition metal catalyst, it was possible to obtain both the oxygen absorption rate and the odor suppressing effect. However, when the resin composition is used for the oxygen absorption layer to provide a deoxidizing multilayered body having three layers of an isolation layer, the oxygen absorption layer, and an oxygen barrier layer, the oxygen absorption rate was significantly decreased although it was possible to obtain the odor suppressing effect.

By contrast, the deoxidizing multilayered body of the present invention is constituted by laminating at least an isolation layer (A), an odor absorption layer (B) which contains an odor absorbent, an oxygen absorption layer (C), and an oxygen barrier layer (D) in this order, and therefore can suppress odor while exhibiting high oxygen absorption capability. Further, by compounding an acidic gas absorbent in the isolation layer (A) to prepare an acidic gas absorbent isolation layer (Aa), production of an acidic gas can be also suppressed. Further, a reinforcement layer which is located adjacent to them and between them and can increase the strength of the film, a recycle layer in which a recovered resin is reused, an adhesive layer which improves the interlayer strength, etc. can be also laminated within the range which does not impair the effect of the present invention.

Figure 1:
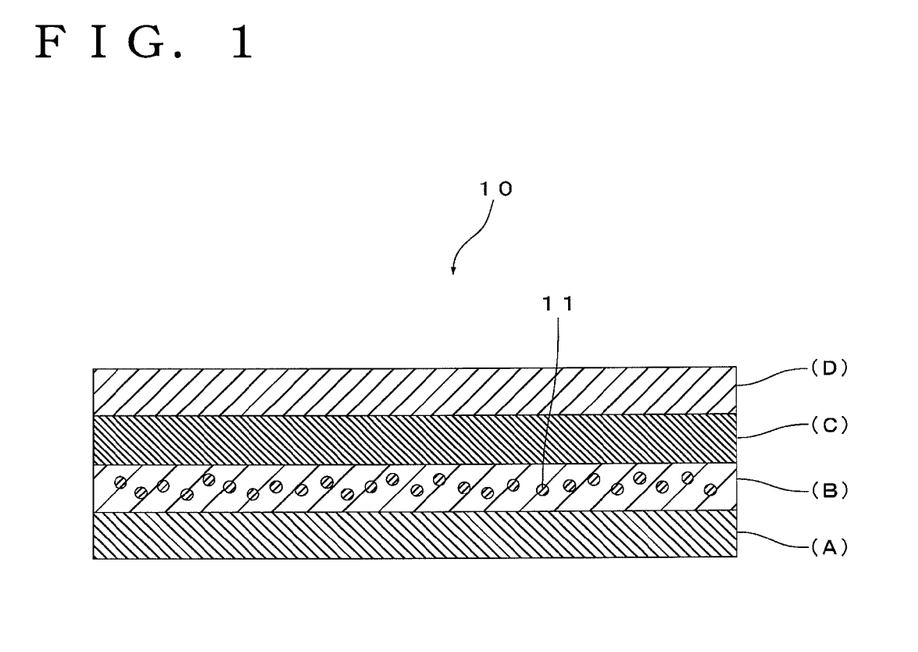
FIG. 1 is a cross-sectional view of an embodiment of a deoxidizing multilayered body according to the present invention.

Herein below, one embodiment for carrying out the present invention is explained in view of the drawings. FIG. 1 is a cross-sectional view of an embodiment of a deoxidizing multilayered body according to the present invention. In FIG. 1, (A) is an isolation layer which contains a thermoplastic resin. (B) is an odor absorption layer which is made from an odor absorbent resin composition (b) that contains an oxidizable thermoplastic resin, a transition metal catalyst, and an odor absorbent. (C) is an oxygen absorption layer which is made from an oxygen absorbent resin composition (c) that contains an oxidizable thermoplastic resin and a transition metal catalyst. Further, (D) is an oxygen barrier layer which contains an oxygen barrier substance. Further, in FIG. 1, reference 11 represents an odor absorbent.

The invention relates to a deoxidizing multilayered body constituted by laminating at least four layers of the isolation layer (A), the odor absorption layer (B), the oxygen absorption layer (C), and the oxygen barrier layer (D) in this order, and a deoxidizing packaging container which has, at least in a part thereof, the deoxidizing multilayered body and which is constituted by placing the isolation layer (A) on the inside of the container.

Herein below, the isolation layer (A), the odor absorption layer (B), the oxygen absorption layer (C), and the oxygen barrier layer (D) which constitute the deoxidizing multilayered body of the present invention will be explained in detail.

[Isolation Layer (A)]

The isolation layer (A) which constitutes the deoxidizing multilayered body of the present invention contains a thermoplastic resin, plays a role of separating a stored product from the odor absorption layer (B), which is made from an odor absorbent resin composition (b) that contains an oxidizable thermoplastic resin, a transition metal catalyst, and an odor absorbent, and at the same time it functions as a sealant. Further, it also plays a role of performing efficient oxygen permeation not to prevent the fast oxygen absorption by the oxidizable thermoplastic resin contained in the odor absorbent resin composition (b), which constitutes the odor absorption layer (B).

The isolation layer (A) of the present invention means a layer which contains a thermoplastic resin and has the oxygen permeability of 1000 cc/($m^2$·24 h·atm) or more. If the oxygen permeability of the isolation layer (A) is less than 1000 cc/($m^2$·24 h·atm), the rate of absorbing oxygen by the deoxidizing multilayered body of the present invention becomes slow, and therefore undesirable. The oxygen permeability indicates the value that is measured by using OX-TRAN-2/21 manufactured by MOCON, Inc. under the conditions having the measurement temperature of 25° C. and the cell area of 50 $cm^2$.

The representative examples of the thermoplastic resin that is used for the isolation layer (A) include a polyolefin resin like polyethylene, an ethylene-α-olefin copolymer, polypropylene, a propylene-ethylene random copolymer, a propylene-ethylene block copolymer, an ethylene-cyclic olefin copolymer, etc., various ion cross-linked products of an ethylene-(meth)acrylate copolymer, an ethylene-methyl (meth)acrylate copolymer, and an ethylene-(meth)acrylate copolymer, an ethylenic copolymer like an ethylene-vinyl acetate copolymer, etc., a synthetic rubber resin like polybutadiene, polyisoprene, a styrene-butadiene copolymer, etc., and their hydrogenated resins, and a copolymer of soft polyvinyl chloride, polystyrene, polymethylpentene, a silicone resin, and polysiloxane and other resin, etc., and they can be used singly or in combination thereof.

The thickness of the isolation layer (A) is preferably 1 to 100 μm, and more preferably 1 to 20 μm. In this case, the oxygen absorption rate of the deoxidizing multilayered body can be increased more compared to a case in which the thickness does not fall within the above range.

In the deoxidizing multilayered body of the present invention, the isolation layer (A) is preferably an acidic gas absorbent isolation layer (Aa), which is made from an acidic gas absorbent resin composition (a) that contains an acidic gas absorbent and a thermoplastic resin. By having the acidic gas absorbent isolation layer (Aa) as the isolation layer (A), the acidic gas which is produced as a by-product with the oxygen absorption reaction can be absorbed and the odor originating therefrom can be suppressed.

The acidic gas absorbent used for the present invention is a compound which chemically and/or physically fixes odorous components mainly originating from carboxylic acids. The acidic gas absorbent used for the present invention is preferably a base compound based on the reason that it can neutralize the odorous components originating from carboxylic acids, and therefore is effective for chemical fixing of the odorous components.

Preferred examples of the base compound include an inorganic base compound like a hydroxide, a carbonate, a hydrogen carbonate, an oxide, etc. of a metal belonging to Group 1 and Group 2 of the Periodical Table. Based on the reason of high basicity, a hydroxide and an oxide of the metal belonging to Group 2 are particularly preferable. Specifically, sodium hydroxide, potassium hydroxide, calcium hydroxide, magnesium hydroxide, sodium carbonate, potassium carbonate, calcium carbonate, magnesium carbonate, sodium hydrogen carbonate, potassium hydrogen carbonate, calcium hydrogen carbonate, calcium oxide and magnesium oxide, etc. are preferable based on the reason that they are excellent in economy. Magnesium oxide is particularly preferred based on the reason that it has high safety. In addition, it is also possible to use an organic base compound as a base compound, and the representative example includes an amine compound having a non-covalent electron pair on the nitrogen.

The compounding ratio of the acidic gas absorbent is preferably 0.01 to 50 parts by mass, and particularly preferably 0.1 to 10 parts by mass relative to the 100 parts by mass of the thermoplastic resin contained in the acidic gas absorbent resin composition (a). In this case, not only the capability of absorbing an acidic gas is increased more compared to a case in which the compounding ratio does not fall within the above range, but also reduction in the oxygen permeability of the acidic gas absorbent isolation layer (Aa) caused by the acidic gas absorbent can be prevented.

The acidic gas absorbent resin composition (a) which constitutes the acidic gas absorbent isolation layer (Aa) may be produced by, for example, mixing a thermoplastic resin and a powdery acidic gas absorbent at the temperature which is the same or higher than the temperature at which each resin composition melts.

[Odor Absorption Layer (B) and Oxygen Absorption Layer (C)]

The odor absorption layer (B) which constitutes the deoxidizing multilayered body of the present invention is made from an odor absorbent resin composition (b) that contains an oxidizable thermoplastic resin, a transition metal catalyst, and an odor absorbent. Further, the oxygen absorption layer (C) which constitutes the deoxidizing multilayered body of the present invention is made from an oxygen absorbent resin composition (c) that contains an oxidizable thermoplastic resin and a transition metal catalyst.

In the deoxidizing multilayered body of the present invention, the odor absorption layer (B) is essential for absorbing odor originating from aldehydes that are produced as a by-product of an oxygen absorption reaction. Further, the oxygen absorption layer (C) is also essential for obtaining sufficient oxygen absorption rate.

The thickness of the odor absorption layer (B) and the oxygen absorption layer (C) is preferably 1 to 300 μm, and more preferably 1 to 200 μm, is respectively. In this case, the oxygen absorption rate of the deoxidizing multilayered body can be increased more compared to a case in which the thickness does not fall within the above range, and at the same time loss of flexibility as a packaging material can be prevented.

The oxidizable thermoplastic resin that is used for the present invention is means a thermoplastic resin which has any one of an aryl group, a benzyl group, an alcohol group, an ether group, an aldehyde group, a ketone group, and a tertiary carbon. Among them, in the present invention, it is preferable to use a thermoplastic resin having an aryl group as an oxidizable thermoplastic resin.

Examples of the oxidizable thermoplastic resin that is contained in the odor absorbent resin composition (b) and the oxygen absorbent resin composition (c) include an organic polymer compound having a portion in which a double bond between carbons is included, an organic polymer compound having a hydrogen atom bonded to a tertiary carbon atom, and an organic polymer compound having a benzyl group, and they can be used singly or in combination thereof. The carbon-carbon double bond in the organic polymer compound having a portion in which carbons bond with a double bond is included may be present in the main chain or the side chain of the polymer. Representative examples include 1,4-polybutadiene, 1,2-polybutadiene, 1,4-polyisoprene, 3,4-polyisoprene, styrene butadiene rubber, a styrene-butadiene-styrene block copolymer, a styrene-isoprene-styrene block copolymer, an ethylene/methyl acrylate/cyclohexenyl methyl acrylate copolymer, etc. Further, examples of the organic polymer compound having a hydrogen atom bonded to a tertiary carbon atom include polypropylene, polymethylpentene, etc. Examples of the organic polymer compound having a benzyl group include hydrogenated styrene butadiene rubber, hydrogenated styrene isoprene rubber, etc. Among them, an organic polymer compound having a portion in which carbons bond with a double bond is preferable, and 1,2-polybutadiene is more preferable.

With regard to the oxidizable thermoplastic resin that is contained in the odor absorbent resin composition (b) and the oxygen absorbent resin composition (c), considering the laminate adhesion between the odor absorption layer (B) and the oxygen absorption layer (C), it is preferable to select resins having a fusibility to each other or the identical resin. Further, with respect to the oxidizable thermoplastic resin contained in the odor absorbent resin composition (b), it is preferable to select resins having a fusibility to each other, considering the laminate adhesion between the odor absorption layer (B) and the isolation layer (A).

The transition metal catalyst is a catalyst which has a metal compound like a salt, an oxide, or the like of a transition metal element. As the transition metal element, manganese, iron, cobalt, nickel, and copper are appropriate. Manganese, iron, and cobalt are particularly appropriate as they show an excellent catalytic activity. Examples of the salt of the transition metal element include a mineral acid salt and a fatty acid salt of the transition metal element Examples thereof include a hydrochloric acid salt, a sulfuric acid salt, a nitric acid salt, an acetic acid salt, or a higher fatty acid salt of the transition metal element. Representative examples include cobalt octylate, manganese octylate, manganese naphthenate, iron naphthenate, cobalt stearate, etc.

The transition metal catalyst that is preferable in terms of easy handleability is a supported catalyst in which salts of the transition metal element are supported on a carrier. Type of the carrier is not specifically limited, however, zeolite, diatomaceous earth, calcium silicate, etc. may be used. In particular, an aggregate having a size of 0.1 to 200 μm during and after preparation of the catalyst is preferable as it has good handleability. In particular, a carrier which is 10 to 100 nm when dispersed in a resin composition is preferable as it can give a transparent resin composition when it is compounded in a resin composition. Examples of such carrier include synthetic calcium silicate. The compounding ratio of the transition metal catalyst to the odor absorbent resin composition (b) and the oxygen absorbent resin composition (c) is, from the view point of the oxygen absorption capability, physical strength, and economy, preferably 0.001 to 10% by mass, and particularly preferably 0.01 to 1% by mass in terms of the mass of the metal atom in each resin composition of the odor absorbent resin composition (b) and the oxygen absorbent resin composition (c).

The odor absorbent used in the present invention is a substance which chemically and/or physically fixes odorous components mainly originating from aldehydes. With respect to the odor absorbent used in the present invention, any substance having the above property can be used within the range which does not impair the effect of the present invention. However, based on the reason that the odorous components originating from aldehydes can be effectively fixed, among them, a hydrazine derivative, a urea derivative, or a guanidine derivative is preferably used as an odor absorbent. At this time, it is possible to use the derivative singly or in combination thereof as an odor absorbent, or it can be used as an odor absorbent by combining it with other substances. Further, a commercially available deodorant having the above-mentioned function may be also used as an odor absorbent.

Further, it is also possible that a hydrazine derivative, a urea derivative, or a guanidine derivative is supported on a carrier and used as an odor absorbent. Using it according to this embodiment is more preferable since physical adsorption of the aldehydes on the carrier can also be expected. Type of the carrier is not specifically limited, however, zeolite, diatomaceous earth, calcium silicate, porous silica, activated white clay, etc. may be used. Among them, calcium silicate, porous silica, and activated white clay are preferable. The amount of a hydrazine derivative, a urea derivative, or a guanidine derivative supported on a carrier is preferably 0.001 to 30 mmol/(g-carrier), and more preferably 0.01 to 10 mmol/(g-carrier).

The compounding ratio of the odor absorbent is preferably 0.1 to 50% by mass, and particularly preferably 0.1 to 10% by mass in the odor absorbent resin composition (b). In this case, there is an advantage that is more excellent in the odor absorption capability or the transparency than a case in which the compounding ratio does not fall within the above range.

The hydrazine derivative indicates an organic substance having N—NH$_2$ group like hydrazine, phenyl hydrazine and their derivatives, semicarbazide, hydrazide and its derivative, an aminoguanidine derivative, etc. Specific examples include hydrazine, hydrazine sulfate, hydrazine hydrochloride, monomethylhydrazine, 1,1-dimethylhydrazine, aluminum sulfate hydrazine double salt, carbazic acid, formohydrazide, isopropylhydrazine sulfate, tert-butylhydrazine hydrochloride, 1-aminopyrrolidine, aminoguanidine sulfate, aminoguanidine hydrochloride, aminoguanidine bicarbonate, diaminoguanidine hydrochloride, triaminoguanidine nitrate, acethydrazide, benzohydrazide, pentanohydrazide, carbohydrazide, cyclohexane carbohydrazide, benzenesulfonohydrazide, thiocarbohydrazide, thiobenzohydrazide, pentane imidehydrazide, benzohydrazonohydrazide, adipic acid dihydrazide, sebacic acid dihydrazide, dodecanediohydrazide, isophthalic acid dihydrazide, propionic acid hydrazide, salicylic acid hydrazide, 3-hydroxy-2-naphthoic acid hydrazide, oxamic acid hydrazide, oxalyldihydrazide, benzophenone hydrazone, N-aminopolyacrylamide, thiosemicarbazide, 4-methylthiosemicarbazide, 4,4-dimethyl-3-thiosemicarbazide, semicarbazide hydrochloride, and 4-amino-1,2,4-triazole. Among them, aluminum sulfate hydrazine double salt, aminoguanidine sulfate, and aminoguanidine hydrochloride are particularly preferable.

Among the hydrazine derivatives described above, based on the reason that the odorous components originating from aldehydes, in particular acetaldehyde, can be more effectively fixed, the aminoguanidine derivative, the hydrazine double salt, or their mixtures are preferable.

The aminoguanidine derivative indicates the hydrazine derivative having a guanidine structure that is represented by the following structural formula (1) or its salt, and examples thereof include aminoguanidine sulfate, aminoguanidine hydrochloride, etc.

[Kagaku 1]

(1)

Further, $R^1$ to $R^4$ in the formula represent any atom and/or a substituent group, and preferably a hydrogen atom, an alkyl group, or an amino group.

The hydrazine double salt used in the present invention indicates a double salt which is formed by chemical bond between an acidic metal salt and hydrazine. Examples of the metal in the acidic metal salt include magnesium, aluminum, and chrome, and examples of the salt include one kind of a sulfate, a hydrochloride, and a phosphate, or a mixture thereof. For example, when aluminum sulfate and hydrazine are admixed with each other in water, a hydrazine double salt is produced, and it is referred to as aluminum sulfate hydrazine double salt.

Hydrazine ($N_2H_4$) as a chemical compound has an odor absorption capability. However, as it has low boiling temperature of 113° C., and is easily decomposed, it is not easy to obtain the odor absorbent resin composition of the present invention by kneading it with a resin. However, by preparing a hydrazine double salt, these disadvantages can be overcome while maintaining the odor absorption capability that is intrinsically possessed by hydrazine, and thus it is a preferred embodiment of the present invention to produce an odor absorbent containing the hydrazine double salt.

The urea derivative indicates a compound which has the structure that is represented by the following structural formula (2) and does not have a $N-NH_2$ group in the molecule. Specific examples thereof include urea, 1-methylurea, 1,1-dimethylurea, 1,3-dimethylurea, ethylurea, 1,1-diethylurea, 1,3-diethylurea, arylurea, acetylurea, 1-acetyl-3-methylurea, hydroxyurea, 2-hydroxyethylurea, 1,3-(hydroxymethyl) urea, nitrourea, acetone semicarbazone, acetaldehyde semicarbazone, azodicarbonamide, ethyleneurea, 1-acetyl-2-imidazolidinane, hydantoin, 1-arylhydantoin, glycoluryl, allantoin, biurette, biurea, thiourea, N-methylthiourea, 1,3-dimethylthiourea, trimethylthiourea, 1,3-diethyl-2-thiourea, N,N'-diisopropylthiourea, 1-aryl-2-thiourea, 1-acetyl-2-thiourea, acetone thiosemicarbazone, ethylenethiourea, 4,4-dimethyl-2-imidazolidine thione, guanylthiourea, 2,5-dithiobiurea, etc.

[Kagaku 2]

(2)

Further, $R^5$ to $R^7$ in the formula represent any atom and/or any substituent group other than an amino group ($-NH_2$), and they are preferably a hydrogen atom or an alkyl group.

Further, Y represents an oxygen atom or a sulfur atom.

The guanidine derivative indicates a compound which has the guanidine structure that is represented by the following structural formula (3) and does not have a $N-NH_2$ group in the molecule. Specific examples thereof include guanidine, 1-methylguanidine hydrochloride, cyanoguanidine, 1-ethyl-3-guanidinothiourea hydrochloride, creatinine, a creatinine hydrate, 2,4-diamino-1,3,5-triazine, 2,4-diamino-6-methyl-1,3,5-triazine, 2-vinyl-4,6-diamino-1,3,5-triazine, 2-chloro-4,6-diamino-1,3,5-triazine, 2,4-diamino-6-dimethylamino-1,3,5-triazine, 2,4-diamino-6-methoxy-1,3,5-triazine, 2,4-diamino-6-isopropoxy-1,3,5-triazine, 2-amino-4-methoxy-6-methyl-1,3,5-triazine, ameline, amelide, melamine, trichloromelamine, 2-aminopyrimidino, 2,4-diaminopyrimidine, 2,4,6-triaminopyrimidine, 2,4,6-triamino-5-nitrosopyrimidine, 2-amino-4-methylpyrimidine, 2-amino-5-nitropyrimidine, 2-amino-5-chloropyrimidine, 2-amino-5-bromopyrimidine, 2-aminobenzimidazole, 2-aminopurine, 2,6-diaminopurine, guanine, 6-thioguanine, 3-amino-1,2,4-triazole, 3,5-diamino-1,2,4-triazole, etc.

[Kagaku 3]

(3)

Further, $R^8$ to $R^{11}$ in the formula represent any atom and/or any substituent group other than an amino group ($-NH_2$), and they are preferably a hydrogen atom or an alkyl group.

The odor absorbent used in the present invention has a particularly significant effect on absorption of aldehydes.

In the odor absorbent resin composition (b) which constitutes the odor absorption layer (B) and the oxygen absorbent resin composition (c) which constitutes the oxygen absorption layer (C), another thermoplastic resin that is different from the oxidizable thermoplastic resin may be further compounded to improve the dispersability of other compounding components or to increase the oxygen absorption rate by enhancing the oxygen permeability of each layer described above. Examples of such thermoplastic resin include high density polyethylene, low density polyethylene, linear-chain low density polyethylene, metallocene linear-chain low density polyethylene (herein below, described as "m-LLDPE"), polypropylene, an ethylene vinyl acetate copolymer, polystyrene, polymethylpentene, an ethylene vinyl alcohol copolymer, etc. The compounding amount of the thermoplastic resin is preferably 1000 parts by mass or less, and particularly preferably 500 parts by mass or less relative to 100 parts by mass of the oxidizable thermoplastic resin. When the compounding amount is 1000 parts by mass or less, the compounding amount of the oxidizable thermoplastic resin relatively increases, and as a result, reduction in the oxygen absorption capability can be more sufficiently inhibited compared to a case in which the compounding amount is more than 1000 parts by mass. Further, the thermoplastic resin to be compounded preferably has high miscibility with oxidizable thermoplastic resin or high oxygen permeability after formed into a film.

The odor absorbent resin composition (b) which constitutes the odor absorption layer (B) can be produced, for example, by mixing a resin composition containing an oxidizable thermoplastic resin, a resin composition containing a transition metal catalyst, and a resin composition containing an odor absorbent at the temperature which is the same or higher than the temperature at which each resin composition melts. Alternatively, it can be produced by mixing a resin composition containing an oxidizable thermoplastic resin, a resin composition containing a transition metal catalyst, and a powdery odor absorbent at the temperature which is the same or higher than the temperature at which each resin composition melts. Further, it can be also produced by mixing a resin composition containing an oxidizable thermoplastic resin and a transition metal catalyst and a powdery odor absorbent at the temperature which is the same or higher than the temperature at which the resin composition melts.

The oxygen absorbent resin composition (c) which constitutes the oxygen absorption layer (C) can be produced, for example, by mixing a resin composition containing an oxidizable thermoplastic resin and a resin composition containing a transition metal catalyst at the temperature which is the same or higher than the melting temperature of the resins.

According to the deoxidizing multilayered body of the present invention, if desired, a photoinitiator may be included in the odor absorbent resin composition (b) and/or the oxygen absorbent resin composition (c) to activate the oxygen absorption reaction. The photoinitiator is a substance which functions to increase the reaction speed by efficiently generating active species in a reaction system for the oxygen absorption reaction. In the present invention, it is preferable that the photoinitiator molecule which is excited by light irradiation extracts a hydrogen from the oxidizable thermoplastic resin to give an active radical, and thus initiates the oxidation reaction.

Representative examples of the photoinitiator include benzophenone and its derivative, a thiazine dye, a metal porphyrin derivative, an anthraquinone derivative, etc. Preferred is a benzophenone derivative which contains a benzophenone skeleton structure. The compounding ratio of the photoinitiator is preferably 0.001 to 10% by mass, and particularly preferably 0.01 to 1% by mass in each of the resin compositions.

The light irradiated to the deoxidizing multilayered body of the present invention is one kind of electromagnetic wave which gives an energy to the photoinitiator to be in the exited state. The wavelength of the light for activating the oxygen absorption is preferably 180 nm to 800 nm, and UV light in the range of 200 to 380 nm is particularly preferable.

The photoinitiator may be included in both of the odor absorbent resin composition (b) and the oxygen absorbent resin composition (c). However, as the active species that are generated by light irradiation are more easily produced from the oxygen absorbent resin composition (c) and the active species are transferred to the odor absorbent resin composition (b), it can be included only in the oxygen absorbent resin composition (c), and this embodiment is economical and desirable.

As a method of activating the oxygen absorption other than those described above, the oxidation reaction can be initiated by extracting a hydrogen from the oxidizable thermoplastic resin by giving an energy from outside like a radiation including electron ray, α ray, β ray, γ ray, X ray, etc., and heat, high frequency wave, ultrasonic wave, etc., and by providing it as a radical.

By including at least one additive selected from a drying agent, an adsorbent, an anti-bacterial agent, and a coloring agent in the odor absorbent resin composition (b) which constitutes the odor absorption layer (B) and/or the oxygen absorbent resin composition (c) which constitutes the oxygen absorption layer (C) in the present invention, the composition described above can be prepared into a composition which has an oxygen absorption function and also other functions like drying function, etc. Further, the deoxidizing multilayered body of the present invention can be prepared into a multilayered body which contains a layer including at least one additive selected from a drying agent, an adsorbent, an anti-bacterial agent, and a coloring agent within the range which does not impair the effect of the present invention.

The drying agent mentioned in the present invention means an agent which absorbs moisture from the air, and examples thereof include silica gel, quicklime, calcium chloride, phosphorus pentoxide, aluminum oxide, etc.

The adsorbent mentioned in the present invention means an agent which physically fixes an atom, a molecule, a fine particle, etc. on its surface, and specific examples thereof include active carbon, zeolite, silica gel, aluminum oxide, etc. Among them, silica gel and aluminum oxide are preferable because they also have a function of a drying agent.

The anti-bacterial agent mentioned in the present invention means an agent which inhibits growth of bacteria or kills bacteria, and specific examples thereof include an inorganic anti-bacterial agent or an organic anti-bacterial agent. In addition, the examples of the inorganic anti-bacterial agent include silver, copper, zinc, or their chemical compounds, and the examples of the organic anti-bacterial agent include hinokitiol and chitosan in addition to a chemical like a quaternary ammonium salt, thiabendazole, organic silicone quaternary ammonium salt, etc. The natural anti-bacterial agent is more preferable from the viewpoint of safety.

The coloring agent mentioned in the present invention means an agent which is used for coloring whole or a part of the deoxidizing multilayered body of the present invention, and examples thereof include an inorganic pigment like titanium oxide and an organic pigment like phthalocyanine, etc.

The compounding ratio of the inorganic base and the amine compound in the oxygen absorbent resin composition (c) which constitutes the oxygen absorption layer (C) used in the present invention is preferably 1% by mass or less, and particularly preferably less than 0.1% by mass. In this case, the oxygen absorption capability of the oxygen absorbent multilayered body can be improved more compared to a case in which the inorganic base and/or the amine compound are contained in an amount of more than 1% by mass in the oxygen absorption layer (C).

The inorganic base mentioned in the present invention means an inorganic compound which exhibits a basic property, and the oxidizable thermoplastic resin, the transition metal catalyst, and the photoinitiator are not included therein. As the inorganic base inhibits the oxidation reaction of the oxidizable thermoplastic resin, the oxygen absorption capability of the oxygen absorbent multilayered body is significantly decreased if the inorganic base is included in the oxygen absorption layer (C).

Examples of the inorganic base include a hydroxide, a carbonate, a hydrogen carbonate, an oxide, etc. of a metal belonging to Group 1 and Group 2 of the Periodical Table. Specific examples thereof include lithium hydroxide, sodium hydroxide, potassium hydroxide, rubidium hydroxide, cesium hydroxide, calcium hydroxide, strontium hydroxide, barium hydroxide, magnesium hydroxide, sodium carbonate, potassium carbonate, calcium carbonate, magnesium carbonate, sodium hydrogen carbonate, potassium hydrogen carbonate, calcium hydrogen carbonate, calcium oxide, magnesium oxide, etc. Among them, lithium hydroxide, sodium hydroxide, potassium hydroxide, rubidium hydroxide, cesium hydroxide, calcium hydroxide, strontium hydroxide, barium hydroxide, magnesium hydroxide, calcium oxide, and magnesium oxide significantly inhibit the oxidation of the oxidizable thermoplastic resin.

The amine compound mentioned in the present invention means a compound which contains a primary to a tertiary or a quaternary ammonium ion in the molecule, and the oxidizable thermoplastic resin, the transition metal catalyst, and the photoinitiator are not included therein. As the amine compound inhibits the oxidation reaction of the oxidizable thermoplastic resin, the oxygen absorption capability of the oxygen absorbent multilayered body is significantly decreased if the amine compound is included in the oxygen absorption layer (C).

Examples of the amine compound include an aliphatic amine, an aromatic amine, a hydroxide of tetraalkylammonium, a hydrazine derivative, a urea derivative, a guanidine derivative, etc. Examples of the aliphatic amine include methylamine, ethylamine, dimethylamine, diethylamine, trimethylamine, triethylamine, ether amine, triethanolamine, N,N-diisopropylethylamine, piperidine, piperazine, morpholine, quinuclidine, amantadine, an amino acid, etc.

Examples of the aromatic amine include pyridine, 4-dimethylaminopyridine, aniline, toluidine, benzidine, triethylamine, ethylenediamine, tetramethylethylenediamine, hexamethylenediamine, diethylenetriamine, triethylenetetramine, tetraethylenepentamine, pentaethylenehexamine, spermidine, spermine, diazabicycloundecene, aniline, catechol amine, phenethylamine, 1,8-bis(dimethylamino)naphthalene, etc. Examples of the hydroxide of tetraalkylammonium include tetramethylammonium hydroxide, tetraethyl ammonium hydroxide, etc.

Examples of the hydrazine derivative include hydrazine, hydrazine sulfate, hydrazine hydrochloride, monomethylhydrazine, 1,1-dimethylhydrazine, aluminum sulfate hydrazine double salt, carbazic acid, formohydrazide, isopropylhydrazine sulfate, tert-butylhydrazine hydrochloride, 1-aminopyrrolidine, aminoguanidine sulfate, aminoguanidine hydrochloride, aminoguanidine bicarbonate, diaminoguanidine hydrochloride, triaminoguanidine nitrate, acethydrazide, benzohydrazide, pentanohydrazide, carbohydrazide, cyclohexane carbohydrazide, benzenesulfonohydrazide, thiocarbohydrazide, thiobenzohydrazide, pentane imidehydrazide, benzohydrazonohydrazide, adipic acid dihydrazide, sebacic acid dihydrazide, dodecanediohydrazide, isophthalic acid dihydrazide, propionic acid hydrazide, salicylic acid hydrazide, 3-hydroxy-acid hydrazide, oxamic acid hydrazide, oxalyldihydrazide, benzophenone hydrazone, N-aminopolyacrylamide, thiosemicarbazide, 4-methylthiosemicarbazide, 4,4-dimethyl-3-thiosemicarbazide, hydrochloride semicarbazide, 4-amino-1,2,4-triazole, etc.

Examples of the urea derivative include urea, 1-methylurea, 1,1-dimethylurea, 1,3-dimethylurea, ethyiurea, 1,1-diethylurea, 1,3-diethylurea, arylurea, acetylurea, 1-acetyl-3-methylurea, hydroxyurea, 2-hydroxyethylurea, 1,3-(hydroxymethypurea, nitrourea, acetone semicarbazone, acetaldehyde semicarbazone, azodicarbonamide, ethyleneurea, 1-acetyl-2-imidazolidinone, hydantoin, 1-arylhydantoin, glycoluryl, allantoin, biurette, biurea, thiourea, N-methylthiourea, 1,3-dimethylthiourea, trimethylthiourea, 1,3-diethyl-2-thiourea, N,N'-diisopropylthiourea, 1-aryl-2-thiourea, 1-acetyl-2-thiourea, acetone thiosemicarbazone, ethylenethiourea, 4,4-dimethyl-2-imidazolidine thione, guanyithiourea, 2,5-dithiobiurea, etc.

Examples of the guanidine derivative include guanidine, 1-methylguanidine hydrochloride, cyanoguanidine, 1-ethyl-3-guanidinothiourea hydrochloride, creatinine, creatinine hydrate, 2,4-diamino-1,3,5-triazine, 2,4-diamino-6-methyl-1,3,5-triazine, 2-vinyl-4,6-diamino-1,3,5-triazine, 2-chloro-4,6-diamino-1,3,5-triazine, 2,4-diamino-6-dimethylamino-1,3,5-triazine, 2,4-diamino-6-methoxy-1,3,5-triazine, 2,4-diamino-6-isopropoxy-1,3,5-triazine, 2-amino-4-methoxy-6-methyl-1,3,5-triazine, ameline, amelide, melamine, trichloromelamine, 2-aminopyrimidine, 2,4-diaminopyrimidine, 2,4,6-triaminopyrimidine, 2,4,6-triamino-5-nitrosopyrimidine, 2-amino-4-methylpyrimidine, 2-amino-5-nitropyrimidine, 2-amino-5-chloropyrimidine, 2-amino-5-bromopyrimidine, 2-aminobenzimidazole, 2-aminopurine, 2,6-diaminopurine, guanine, 6-thioguanine, etc.

Among these amine compounds, ethylenediamine, tetramethylethylenediamine, hexamethylenediamine, diethylenetriamine, triethylenetetramine, tetraethylenepentamine, pentaethylenehexamine, diazabicycloundecene, tetramethylammonium hydroxide, tetraethylammonium hydroxide, hydrazine, hydrazine sulfate, hydrazine hydrochloride, aluminum sulfate hydrazine double salt, carbazic acid, formohydrazide, 1,5-diphenylcarbonohydrazide, isopropylhydrazine sulfate, tert-butylhydrazine hydrochloride, aminoguanidine sulfate, aminoguanidine hydrochloride, aminoguanidine bicarbonate, diaminoguanidine hydrochloride, triaminoguanidine nitrate, urea, thiourea, ethyleneurea, melamine, adipic acid dihydrazide, and sebacic acid dihydrazide significantly inhibit the oxidation of the oxidizable thermoplastic resin.

The total compounding ratio of the inorganic base and the amine compound in the oxygen absorbent resin composition (c) which constitutes the oxygen absorption layer (C) is most preferably 0% by mass. In this case, the inorganic base and the amine compound are not included in the oxygen absorption layer (C), and therefore the oxygen absorption capability of the oxygen absorbent multilayered body can be improved more compared to a case in which the inorganic base and/or the amine compound are included in the oxygen absorbent resin composition (c).

Herein, the total compounding ratio of 0% by mass for the inorganic base and the amine compound in the oxygen absorbent resin composition (c) means that the oxygen absorbent resin composition (c) has the following constitution. Specifically, it means that the total compounding ratio of the oxidizable thermoplastic resin, the transition metal catalyst, and accessory components in the oxygen absorbent resin composition (c) is 100% by mass when the oxygen absorbent resin composition (c) contains a oxidizable thermoplastic resin, a transition metal catalyst, and accessory components. Herein, the accessory components indicate at least one component that is selected from the group consisting of a photoinitiator, a thermoplastic resin which is different from the oxidizable thermoplastic resin, and additives. In addition, the accessory components are different from the inorganic base and the amine compound which are described above.

[Oxygen Barrier Layer (D)]

The oxygen barrier substance which constitutes the oxygen barrier layer (D) means a substance having the oxygen permeability of 100 cc/(m$^2 \cdot$24 h ·atm) or less. Representative examples of the oxygen barrier layer (D) include a metal foil like an aluminum foil, in addition to a layer containing polyester, polyamide, nylon MXD6, an ethylene-vinyl alcohol copolymer, a vinylidene chloride, etc. to which silica or alumina is vapor-deposited. The thickness of the oxygen barrier layer (D) is preferably 1 to 300 μm, and more preferably 1 to 100 μm. In this case, the oxygen barrier effect can be improved more and loss of flexibility as a packaging material can be simultaneously prevented compared to a case in which the thickness does not fall within the above range.

The deoxidizing multilayered body of the present invention can be produced, for example, by co-extrusion of a multilayered body having a multilayer structure in which the isolation layer (A), the odor absorption layer (B), the oxygen absorption layer (C), and the oxygen barrier layer (D) are laminated in this order, by using a machine for producing a multilayered film. Or, it is also possible that a multilayered body having a multilayer structure in which the isolation layer (A), the odor absorption layer (B), and the oxygen absorption layer (C) are laminated in this order is produced by co-extrusion by using a machine for producing a multilayered film, and the oxygen barrier layer (D) is laminated thereto by using an adhesive. Further, for the co-extrusion, an adhesive resin may be used for each interlayer region if necessary. Further, in addition to the each layer described above, an optional layer may be laminated within the range that a certain property of the deoxidizing multilayered body of the present invention is not impaired, and the layers may be laminated by combining various methods.

Figure 2:
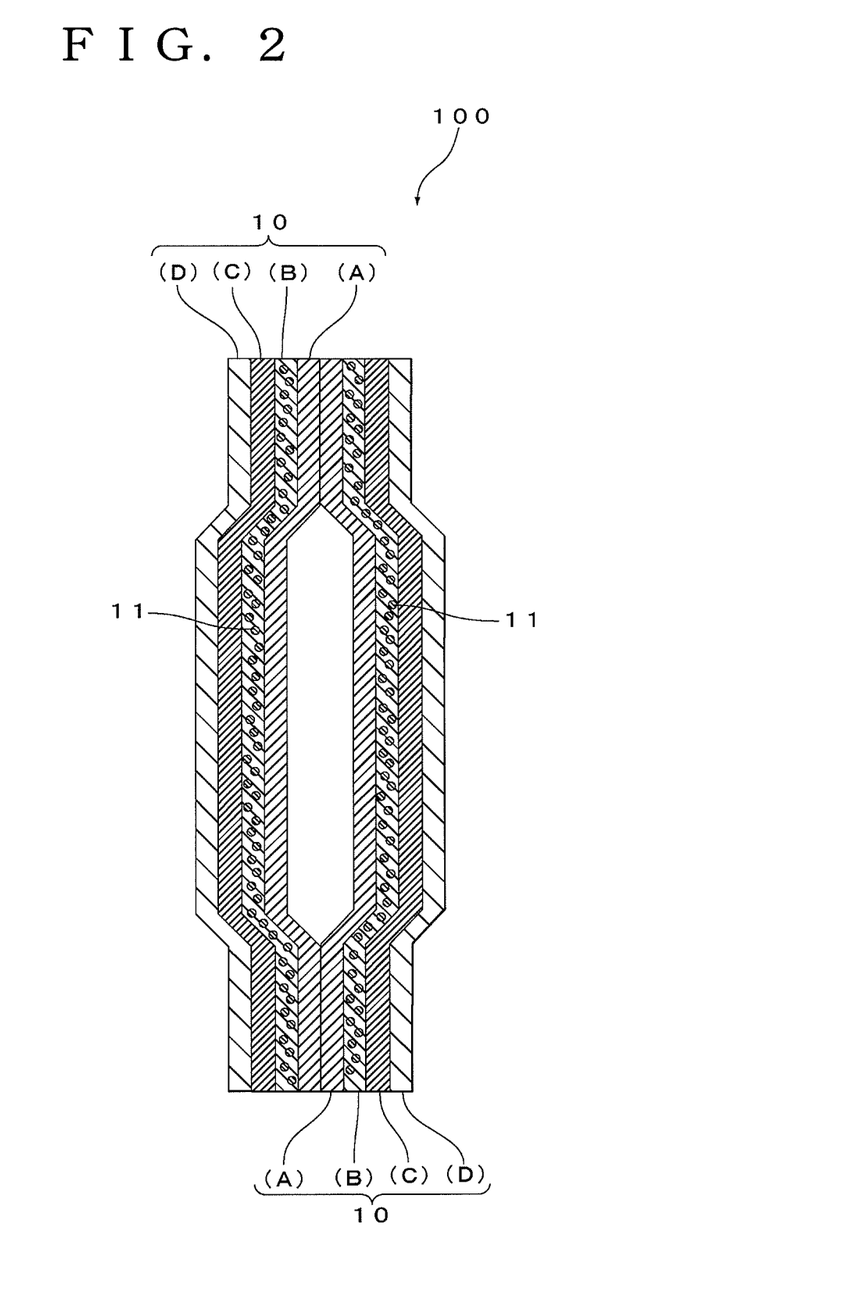
FIG. 2 is a cross-sectional view of an embodiment of a deoxidizing packaging container according to the present invention.

The deoxidizing multilayered body of the present invention may be used as a deoxidizing packaging material in a part or whole of a packaging container like a packaging bag, etc. FIG. 2 is a cross-sectional view of an embodiment of a deoxidizing packaging container according to the present invention, illustrating an example of using the deoxidizing multilayered body 10 of FIG. 1. As shown in FIG. 2, a deoxidizing packaging container 100 has two deoxidizing multilayered bodies 10. Both of the deoxidizing multilayered bodies 10 are bonded in a state in which the isolation layer (A) faces the inside. The deoxidizing packaging container 100 may be produced, for example, by heat-sealing the edge parts of the deoxidizing multilayered bodies 10. Further, while FIG. 2 illustrates an example in which the deoxidizing multilayered body is used on whole of a packaging container, it can be used on a part of a packaging container by using it as a cover material of a container or on just one surface of is a pouch bag.

Further, the deoxidizing multilayered body of the present invention may be used as a deoxidizer processed into a sheet shape or a film shape, or used as a deoxidizer packaging body having a shape in which the processed deoxidizer is enclosed in a air-permeable sachet. Further, it can be used as a deoxidizer after molding into a shape like a label, a card, a packing, etc.

As for the odor absorbent resin composition (b) which constitutes the odor absorption layer (B) of the present invention and the oxygen absorbent resin composition (c) which constitutes the oxygen absorption layer (C), by selecting an oxidizable thermoplastic resin with high transparency and finely dispersing an additive like a catalyst, an odor absorbent, etc. in the resin composition, the transparent compositions can be obtained. Accordingly, by using a transparent resin for each layer like the isolation layer (A), the oxygen barrier layer (D), etc. which constitute the multilayered film, a transparent deoxidizing multilayered sheet or film can be prepared. This transparent deoxidizing multilayered sheet or film is appropriate for a packaging material having see-through property.

Use of the deoxidizing multilayered body of the present invention is not limited, and it exhibits a practically valuable deoxidizing absorption capability in the field of preservation and quality maintenance of food products, beverages, pharmaceuticals, medical products, cosmetics, metal products, electronic products, etc.

In particular, since the deoxidizing multilayered body of the present invention can absorb oxygen regardless of the presence or absence of moisture in a subject to be preserved, it can be particularly preferably used for dried food products like powder seasoning, powder coffee, coffee bean, rice, tea, bean, Japanese rice cracker, rice cracker, etc., pharmaceuticals, health products like a vitamin preparation, and industrial materials like electronic parts, etc.

EXAMPLES

Herein below, the present invention will be described in greater detail in view of the Examples and Comparative examples, but the present invention is not limited by them.

Example 1

Powder containing a transition metal catalyst which is obtained by impregnating cobalt octylate (trade name: NIKKA OCTHIX Cobalt, manufactured by Nihon Kagaku Sangyo Co., Ltd., cobalt content: 8% by mass) in synthetic calcium silicate (trade name: MICROCELL E, manufactured by Celite Corporation) followed by drying under reduced pressure and 4-phenylbenzophenone (herein below, described as "PBP") as a photoinitiator were admixed with each other, and melt-kneaded with m-LLDPE (trade name: KERNEL KC570S, manufactured by Japan Polyethylene Corporation) by using a biaxial kneading extruder at 160° C. to prepare a catalyst master batch made from a resin composition having cobalt element content of 1.2% by mass, synthetic calcium silicate (average particle diameter: 2 μm) of 7.5% by mass, and PBP content of 2.1% by mass.

The catalyst master batch described above and syndiotactic 1,2-polybutadiene (trade name: RB820, manufactured by JSR Corporation, herein below, described as "RB"), which is an oxidizable thermoplastic resin, were admixed with each other at the mass ratio of 10:90, and melt-kneaded by using a biaxial kneading extruder at 140° C. to prepare an oxygen absorbent resin composition 1 (containing 0.13 parts by mass of cobalt atom and 10 parts by mass of m-LLDPE relative to 100 parts by mass of RB).

An aqueous solution of aminoguanidine sulfate was impregnated in activated white clay (trade name: GALLEON EARTH, manufactured by Mizusawa industrial Chemicals, Ltd.) followed by drying to obtain an odor absorbent 1 (impregnation amount of aminoguanidine sulfate: 0.8 mmol/(g-carrier)). The odor absorbent 1, the catalyst master batch described above, and RB were admixed with one another at the mass ratio of 6:10:90 (aminoguanidine sulfate: 0.03 mmol/g), and melt-kneaded by using a biaxial kneading extruder at 140° C. to prepare an odor absorbent resin composition 1 (containing 0.13 parts by mass of cobalt atom, 6.7 parts by mass of the odor absorbent 1, and 10 parts by mass of m-LLDPE relative to 100 parts by mass of RB).

A multilayered film having m-LLDPE as an isolation layer (A), the above-mentioned odor absorbent resin composition 1 as an odor absorption layer (B1), and the oxygen absorbent resin composition 1 as an oxygen absorption layer (C1) was produced by co-extrusion. The layer constitution includes the isolation layer (A) with a thickness of about 10 μm, the odor absorption layer (B1) with a thickness of about 20 μm, and the oxygen absorption layer (C1) with a thickness of about 20 μm in this order.

To the oxygen absorption layer (C1) side of the obtained deoxidizing multilayered film, the oxygen barrier layer (D) with a thickness of 12 μm, which is made from silica vapor-deposited polyethylene terephthalate (trade name: TECH BARRIER P2, manufactured by Mitsubishi Plastics, Inc., herein below, described as "SiPET"), was bonded by dry lamination to give a deoxidizing multilayered film 1.

Oxygen absorption capability of the above deoxidizing multilayered film 1 was evaluated. The above deoxidizing multilayered film was illuminated with UV light from the light source of 1 kW high pressure mercury lamp with the illuminance of 6.2 mW/cm$^2$ for 90 seconds (illumination amount of 560 mJ/cm$^2$). After that, the film was processed into a bag to have an oxygen absorption area of 250 cm$^2$, to which 120 mL of a mixture gas containing 5 vol % of oxygen and 95 vol % of nitrogen was added followed by sealing (initial oxygen amount: 0.024 mL/cm$^2$). As a result of maintaining it under the condition of 25° C. and 60%RH, the oxygen concentration was 0.1 vol % after 25 hours. Herein below, the period of time required for the oxygen concentration in a bag to be reduced to 0.1 vol % is referred to as deoxidization time.

Concentration of odorous organic substances from the above-mentioned deoxidizing multilayered film 1 was evaluated. In the oxygen absorption capability test described above, concentration of aldehydes and carboxylic acids in the bag after deoxidization was measured by using a gas detector tube for acetaldehyde (trade name: ACETALDEHYDE 92L (for low concentration), manufactured by Gastec Corporation) and a gas detector tube for acetic acid (trade name: ACETIC ACID 81 L, manufactured by Gastec Corporation). As a result, the concentration of aldehydes was 1 ppm and the concentration of carboxylic acids was 0.3 ppm. Further, no odor from the inside of the bag was identified after the deoxidization. These results are shown in Table 1.

Example 2

An acidic gas absorbent resin composition was produced by mixing m-LLDPE and magnesium oxide at the mass ratio of 100:1.4. A multilayered film having the acidic gas absorbent resin composition as an acidic gas absorbent isolation layer (Aa), the odor absorbent resin composition 1 as an odor absorption layer (B1), and the oxygen absorbent resin composition 1 as an oxygen absorption layer (C1) was produced by laminating the acidic gas absorbent isolation layer (Aa), the odor absorption layer (B1), and the oxygen absorption layer (C1) in this order. To the oxygen absorption layer (C1) side of the multilayered film, the oxygen barrier layer (D) with a thickness of 12 μm, which is made from SiPET, was bonded by dry lamination to give a deoxidizing multilayered film 2.

The oxygen absorption capability of the deoxidizing multilayered film 2 and the amount of the malodorous organic substances released from the deoxidizing multilayered film were evaluated in the same manner as Example 1, and as a result, the deoxidization time was 26 hours. Further, in the bag after the deoxidization concentration of the aldehydes was 1 ppm and concentration of the carboxylic acids was less than 0.25 ppm, which is the lower detection limit of the gas detector tube, and no odor was identified. The results are shown in Table 1.

Example 3

An aqueous solution of ethylene urea was impregnated in activated white clay followed by drying to obtain an odor absorbent 2 (impregnation amount of ethylene urea: 1.5 mmol/(g-carrier)). The odor absorbent 2, the catalyst master batch described in Example 1, and RB were admixed with one another at the mass ratio of 6:10:90 (ethyleneurea 0.08 mmol/g), and melt-kneaded by using a biaxial kneading extruder at 140° C. to prepare an odor absorbent resin composition 2 (containing 0.13 parts by mass of cobalt atom, 6.7 parts by mass of the odor absorbent 2, and 10 parts by mass of m-LLDPE relative to 100 parts by mass of RB).

A multilayered film having the odor absorbent resin composition 2 as an odor absorption layer (B2) and the oxygen absorbent resin composition 1 as an oxygen absorption layer (C1) was produced by laminating the acidic gas absorbent isolation layer (Aa), the odor absorption layer (B2), and the oxygen absorption layer (C1) in this order, similar to Example 2. To the oxygen absorption layer (C1) side of the multilayered film, the oxygen barrier layer (D) with a thickness of 12 μm, which is made from SiPET, was bonded by dry lamination to give a deoxidizing multilayered film 3.

Oxygen absorption capability of the above deoxidizing multilayered film 3 was evaluated. The above deoxidizing multilayered film was illuminated with UV light from the light source of 1 kW high pressure mercury lamp with the illuminance of 6.2 mW/cm$^2$ for 150 seconds (illumination amount of 960 mJ/cm$^2$). After that, the film was processed into a bag to have an oxygen absorption area of 250 cm$^2$, to which 240 mL of a mixture gas containing 5 vol % of oxygen and 95 vol % of nitrogen was added followed by sealing (initial oxygen amount: 0.024 mL/cm$^2$). As a result of maintaining it under the condition of 25° C. and 60%RH, the deoxidization time was 17 hours.

The amount of the odorous organic substances released from the deoxidizing multilayered film 4 was evaluated in the same manner as Example 1, and as a result, in the bag after the deoxidization concentration of the aldehydes was 10 ppm and concentration of the carboxylic acids was less than 0.25 ppm which is the lower detection limit of the gas detector tube. Odor from the inside of the bag was not identified. The results are shown in Table 1.

Comparative Example 1

The odor absorbent 1 described in Example 1 and m-LLDPE were admixed with each other at the mass ratio of 6:100 (aminoguanidine sulfate 0.03 mmol/g), and melt-kneaded by using a biaxial kneading extruder at 140° C. to prepare an odor absorbent resin composition 3 (containing 6 parts by mass of the odor absorbent 1 relative to 100 parts by mass of m-LLDPE).

A multilayered film having the isolation layer (A), the odor absorption layer (X), and the oxygen absorption layer (C1) was produced in the same manner as Example 1 except that the odor absorption layer (X) made from the above-mentioned odor absorbent resin composition 3 was laminated instead of the odor absorption layer (B1) made from the odor absorbent resin composition 1. To the oxygen absorption layer (C1) side of the multilayered film produced, the oxygen barrier layer (D) with a thickness of 12 μm, which is made from SiPET, was bonded by dry lamination to give a deoxidizing multilayered film 4.

The oxygen absorption capability of the deoxidizing multilayered film 4 and the concentration of the malodorous organic substances released from the deoxidizing multilayered film were evaluated in the same manner as Example 1, and as a result, the deoxidization time was 38 hours. Further, concentration of the aldehydes was 1 ppm and concentration of the carboxylic acids was 0.3 ppm in the bag after the deoxidization. The results are shown in Table 1.

TABLE 1

| | Layer constitution | Deoxidization time (h) | Concentration of aldehydes (ppm) | Concentration of carboxylic acids (ppm) |
|---|---|---|---|---|
| Example 1 | Isolation layer (A)/Odor absorption layer (B1)/ Oxygen absorption layer (C1)/Barrier layer (D) | 25 | 1 | 0.3 |
| Example 2 | Acidic gas absorbent isolation layer (Aa)/ Odor absorption layer (B1)/ Oxygen absorption layer (C1)/Barrier layer(D) | 26 | 1 | <0.25 |

TABLE 1-continued

|  | Layer constitution | Deoxidization time (h) | Concentration of aldehydes (ppm) | Concentration of carboxylic acids (ppm) |
|---|---|---|---|---|
| Example 3 | Acidic gas absorbent isolation layer (Aa)/ Odor absorption layer (B2)/ Oxygen absorption layer (C1)/Barrier layer (D) | 17 | 10 | <0.25 |
| Comparative example 1 | Isolation layer (A)/Odor absorption layer (X)/Oxygen absorption layer (C1)/Barrier layer (D) | 38 | 1 | 0.3 |

As is clear from Table 1, although production of odor can be suppressed in Comparative example 1 in which the odor absorption layer (X) only having an odor absorption capability is laminated instead of the odor absorption layer (B1) having both the oxygen absorption capability and the odor absorption capability, the result shows that the oxygen absorption rate is significantly decreased compared to Example 1 in which the odor absorption layer (B1) is laminated. Namely, according to Comparative example 1, the problem relating to obtaining practically sufficient oxygen absorption rate while suppressing the production of odor could not be solved.

Example 4

An aqueous solution of aminoguanidine sulfate was impregnated in porous silica (trade name: SYLYSIA 350, manufactured by Fuji Silysia Chemical Ltd.) followed by drying to obtain an odor absorbent 3 (impregnation amount of aminoguanidine sulfate: 1.5 mmol/(g-carrier)). The odor absorbent 3, the catalyst master batch described in Example 1, and RB were admixed with one another at the mass ratio of 3:10:90 (aminoguanidine sulfate: 0.04 mmol/g), and melt-kneaded by using a biaxial kneading extruder at 140° C. to prepare an odor absorbent resin composition 4 (containing 0.13 parts by mass of cobalt atom, 3.3 parts by mass of the odor absorbent 3, and 10 parts by mass of m-LLDPE relative to 100 parts by mass of RB).

A multilayered film having the odor absorbent resin composition 4 as an odor absorption layer (B4) and the oxygen absorbent resin composition 1 as an oxygen absorption layer (C1) was produced by laminating the isolation layer (A), the odor absorption layer (B4), and the oxygen absorption layer (C1) in this order, similar to Example 1. To the oxygen absorption layer (C1) side of the multilayered film, the oxygen barrier layer (D) with a thickness of 12 μm, which is made from SiPET, was bonded by dry lamination to give a deoxidizing multilayered film 5.

Oxygen absorption capability of the above deoxidizing multilayered film 5 was evaluated. The above deoxidizing multilayered film was illuminated with UV light from the light source of 1 kW high pressure mercury lamp with the illuminance of 6.2 mW/cm² for 150 seconds (illumination amount of 960 mJ/cm²). After that, the film was processed into a bag to have an oxygen absorption area of 250 cm², to which 240 mL of a mixture gas containing 5 vol % of oxygen and to 95 vol % of nitrogen was added followed by sealing (initial oxygen amount: 0.024 mL/cm²). As a result of maintaining it under the condition of 25° C. and 60%RH, the deoxidization time was 18 hours.

The amount of the odorous organic substances released from the deoxidizing multilayered film 5 was evaluated in the same manner as Example 1, and as a result, concentration of the aldehydes was 10 ppm and concentration of the carboxylic acids was less than 0.3 ppm in the bag after the deoxidization, and no odor was identified. The results are shown in Table 2.

Example 5

An aqueous solution of aminoguanidine hydrochloride was impregnated in synthetic calcium silicate (trade name: MICROCELL E, manufactured by Celite Corporation) followed by drying to obtain an odor absorbent 4 (impregnation amount of aminoguanidine hydrochloride: 0.6 mmol/(g-carrier)). The odor absorbent 4, the catalyst master batch described in Example 1, and RB were admixed with one another at the mass ratio of 6:10:90 (aminoguanidine hydrochloride 0.03 mmol/g), and melt-kneaded by using a biaxial kneading extruder at 140° C. to prepare an odor absorbent resin composition 5 (containing 0.13 parts by mass of cobalt atom, 6.7 parts by mass of the odor absorbent 4, and 10 parts by mass of m-LLDPE relative to 100 parts by mass of RB).

A multilayered film having the odor absorbent resin composition 5 as an odor absorption layer (B5) and the oxygen absorbent resin composition 1 described in Example 1 as an oxygen absorption layer (C1) was produced by laminating the isolation layer (A), the odor absorption layer (B5), and the oxygen absorption layer (C1) in this order, similar to Example 1. To the oxygen absorption layer (C1) side of the multilayered film, the oxygen barrier layer (D) with a thickness of 12 μm, which is made from SiPET, was bonded by dry lamination to give a deoxidizing multilayered film 6.

The oxygen absorption capability of the deoxidizing multilayered film 6 and the amount of the malodorous organic substances released from the deoxidizing multilayered film were evaluated in the same manner as Example 3, and as a result, the deoxidization time was 21 hours. Further, concentration of the aldehydes was 18 ppm and concentration of the carboxylic acids was 0.3 ppm in the bag after the deoxidization, and no odor was identified. The results are shown in Table 2.

Comparative Example 2

A multilayered film having the isolation layer (A), the oxygen absorption layer (C1), and the oxygen absorption layer (C1) was produced in the same manner as Example 4 except that the oxygen absorption layer (C1) was laminated instead of the odor absorption layer (B4) made from the odor absorbent resin composition 4. To the oxygen absorption layer (C1) side of the multilayered film, the oxygen barrier layer (D) with a thickness of 12 μm, which is made from SiPET, was bonded by dry lamination to give a deoxidizing multilayered film 7.

The oxygen absorption capability of the deoxidizing multilayered film 7 and the release concentration of the malodorous organic substances from the deoxidizing multilayered film were evaluated in the same manner as Example 4, and as a result, the deoxidization time was 16 hours. Further, concentration of the aldehydes was 55 ppm and concentration of the carboxylic acids was 0.7 ppm in the bag after the deoxidization, and strong odor was identified. Further, the release amount of the aldehydes and the carboxylic acids was determined by measuring concentration of the carboxylic acids and the carboxylic acids in the bag after the deoxidization using a gas detector tube for acetaldehyde (trade name: ACETALDEHYDE 92L (for medium concentration), manufactured by Gastec Corporation) and a gas detector tube for acetic acid (trade name: ACETIC ACID 81 L, manufactured by Gastec Corporation). The results are shown in Table 2.

Comparative Example 3

A multilayered film having the isolation layer (A), the oxygen absorption layer (B4), and the oxygen permeation layer (Y) was produced in the same manner as Example 4 except that the oxygen permeation layer (Y) made from m-LLDPE was laminated instead of the odor absorption layer (C1) made from the oxygen absorption resin composition 1. To the oxygen permeation layer (Y) side of the multilayered film produced, the oxygen barrier layer (D) with a thickness of 12 μm, which is made from SiPET, was bonded by dry lamination to give a deoxidizing multilayered film 8.

The oxygen absorption capability of the deoxidizing multilayered film 8 and the concentration of the malodorous organic substances released from the deoxidizing multilayered film were evaluated in the same manner as Example 4, and as a result, the deoxidization time was 150 hours. Further, in the bag after the deoxidization concentration of the aldehydes was 19 ppm and concentration of the carboxylic acids was 0.3 ppm. The results are shown in Table 2.

Example 6

By impregnating cobalt octylate (trade name: NIKKA OCTHIX Cobalt, manufactured by Nihon Kagaku Sangyo Co., Ltd., cobalt content: 8% by mass) in synthetic calcium silicate (trade name: MICROCELL E, manufactured by Celite Corporation) followed by drying under reduced pressure, powder 1 containing a transition metal catalyst was obtained.

Powder 1 containing a transition metal catalyst and an aldehyde deodorant (trade name: KESMON NS-241, manufactured by Toagosei, Co., Ltd., herein below, described as "NS-241") were admixed with each other, and melt-kneaded with RB by using a biaxial kneading extruder at 140° C. to prepare an odor absorbent resin composition 6 (containing 0.13 parts by mass of cobalt atom and 6 parts by mass of NS-241 relative to 100 parts by mass of RB).

Powder 1 containing a transition metal catalyst and PBP were admixed with each other, and melt-kneaded with RB by using a biaxial kneading extruder at 140° C. to prepare an oxygen absorbent resin composition 2 (containing 0.12 parts by mass of cobalt atom, 0.75 parts by mass of synthetic calcium silicate (average particle diameter: 2 μm), and 0.21 parts by mass of PBP relative to 100 parts by mass of RB).

A multilayered film having the odor absorbent resin composition 6 as an odor absorption layer (B6) and the oxygen absorbent resin composition 2 as an oxygen absorption layer (C2) was produced by laminating the acidic gas absorbent isolation layer (Aa), the odor absorption layer (B6), and the oxygen absorption layer (C2) in this order, similar to Example 2. To the oxygen absorption layer (C2) side of the multilay-

TABLE 2

| | Layer constitution | Deoxidization time (h) | Concentration of aldehydes (ppm) | Concentration of carboxylic acids (ppm) |
|---|---|---|---|---|
| Example 4 | Isolation layer (A)/Odor absorption layer (B4)/ Oxygen absorption layer (C1)/Barrier layer (D) | 18 | 10 | 0.3 |
| Example 5 | Isolation layer (A)/Odor absorption layer (B5)/ Oxygen absorption layer (C1)/Barrier layer (D) | 21 | 18 | 0.3 |
| Comparative example 2 | Isolation layer (A)/Oxygen absorption layer (C1)/ Oxygen absorption layer (C1)/Barrier layer (D) | 16 | 55 | 0.7 |
| Comparative example 3 | Isolation layer (A)/Oxygen absorption layer (B4)/ Oxygen permeation layer (Y)/Barrier layer (D) | 150 | 19 | 0.3 |

As is clear from Table 2, in Comparative example 2 in which the deoxidizing multilayered body that does not laminate the odor absorption layer (B4) containing an odor absorbent, deoxidized state was reached within 16 hours after starting the test. However, as the concentration of the aldehydes in the bag reached 55 ppm, strong odor was produced. Meanwhile, in Comparative example 3 in which only the odor absorption layer (B4) containing an odor absorbent was laminated without laminating the oxygen absorption layer (C1), the oxygen absorption capability was significantly decreased and the deoxidized state was achieved after 150 hours, i.e., after a lapse of six days or more from the start of the test. On the contrary, according to Example 4 in which the odor absorption layer (B4) and the oxygen absorption layer (C1) are laminated and Example 5 in which the odor absorption layer (B5) and the oxygen absorption layer (C1) are laminated, it was possible to achieve both the maintaining of the oxygen absorption capability and the suppressing of concentration of the carboxylic acids and concentration of the aldehydes.

ered film, the oxygen barrier layer (D) with a thickness of 12 μm, which is made from SiPET, was bonded by dry lamination to give a deoxidizing multilayered film 9.

The oxygen absorption capability of the deoxidizing multilayered film 9 and the amount of the malodorous organic substances released from the deoxidizing multilayered film were evaluated in the same manner as Example 1, and as a result, the deoxidization time was 17 hours. Further, in the bag after the deoxidization concentration of the aldehydes was 1 ppm and concentration of the carboxylic acids was less than 0.25 ppm which is the lower detection limit of the gas detector tube, and no odor from the inside of the bag was identified. The results are shown in Table 3.

Comparative Example 4

Powder 1 containing a transition metal catalyst, PBP, and NS-241 were admixed with one another, and melt-kneaded with RB by using a biaxial kneading extruder at 140° C. to prepare an odor absorbent resin composition 7 (containing 0.13 parts by mass of cobalt atom, 0.75 parts by mass of synthetic calcium silicate (average particle diameter: 2 μm), 0.21 parts by mass of PBP, and 6 parts by mass of NS-241 relative to 100 parts by mass of RB).

A multilayered film having the acidic gas absorbent resin composition as an acidic gas absorbent isolation layer (Aa), the odor absorbent resin composition 7 as an odor absorption layer (B7), and the odor absorbent resin composition 7 as an the odor absorption layer (B7) was produced by laminating the acidic gas absorbent isolation layer (Aa), the odor absorption layer (B7), and the odor absorption layer (B7) in this order. To the odor absorption layer (B7) side of the multilayered film, the oxygen barrier layer (D) with a thickness of 12 μm, which is made from SiPET, was bonded by dry lamination to give a deoxidizing multilayered film 10.

The oxygen absorption capability of the deoxidizing multilayered film 10 and the amount of the malodorous organic substances released from the deoxidizing multilayered film were evaluated in the same manner as Example 1, and as a result, the deoxidization time was 62 hours. Further, concentration of the aldehydes was 1 ppm and concentration of the carboxylic acids was less than 0.25 ppm which is the lower detection limit of the gas detector tube, and no odor from the inside of the bag was identified. The results are shown in Table 3.

TABLE 3

| | Layer constitution | Deoxidization time (h) | Concentration of aldehydes (ppm) | Concentration of carboxylic acids (ppm) |
|---|---|---|---|---|
| Example 6 | Acidic gas absorbent isolation layer (Aa)/ Odor absorption layer (B6)/ Oxygen absorption layer (C2)/Barrier layer (D) | 17 | 1 | <0.25 |
| Comparative example 4 | Acidic gas absorbent isolation layer (Aa)/ Odor absorption layer (B7)/ Odor absorption layer (B7)/Barrier layer (D) | 62 | 1 | <0.25 |

Explanation of References
   (A): Isolation layer
   (B): The odor absorption layer, which is made from the odor absorbent resin composition (b)
   (C): The oxygen absorption layer, which is made from the oxygen absorbent resin composition (c)
   (D): The oxygen barrier layer

The invention claimed is:

1. A deoxidizing multilayer body comprising at least an isolation layer (A), an odor absorption layer (B), an oxygen absorption layer (C) and an oxygen barrier layer (D), in this layer order:
   wherein the isolation layer (A) contains a thermoplastic resin;
   the odor absorption layer (B) made from an odor absorbent resin composition (b) that contains an oxidizable thermoplastic resin, a transition metal catalyst, and an odor absorbent;
   the oxygen absorption layer (C) is made from an oxygen absorbent resin composition (c) that contains an oxidizable thermoplstic resin and a transition metal catalyst; and
   the oxygen barrier layer (D) contains an oxygen barrier substance.

2. The deoxidizing multilayered body according to claim 1, wherein the isolation layer (A) is an acidic gas absorbent isolation layer (Aa) which is made from an acidic gas absorbent resin composition (a) that contains an acidic gas absorbent and a thermoplastic resin.

3. The deoxidizing multilayered body according to claim 2, wherein the acidic gas absorbent contains a base compound.

4. The deoxidizing multilayered body according to claim 3, wherein the base compound is magnesium oxide.

5. The deoxidizing multilayered body according to claim 1, wherein the odor absorbent contains a hydrazine derivative, a urea derivative, or a guanidine derivative.

6. The deoxidizing multilayered body according to claim 5, wherein the hydrazine derivative is an aminoguanidine derivative and/or a hydrazine double salt.

7. The deoxidizing multilayered body according to claim 1, wherein the odor absorbent is constituted by supporting a hydrazine derivative, a urea derivative, or a guanidine derivative on a carrier.

8. The deoxidizing multilayered body according to claim 7, wherein the hydrazine derivative is an aminoguanidine derivative and/or a hydrazine double salt.

9. The deoxidizing multilayered body according to claim 1, wherein the odor absorbent resin composition (b) and/or the oxygen absorbent resin composition (c) further contain(s) a photoinitiator.

10. The deoxidizing multilayered body according to claim 1,
   wherein the oxygen absorbent resin composition (c) further contains at least one component selected from the group consisting of photoinitiator, another thermoplastic resin that is different from the oxidizable thermoplastic resin, and an additive, and
   the total compounding ratio of the oxidizable thermoplastic resin, the transition metal catalyst, and the component is 100% by mass in the oxygen absorbent resin composition (c).

11. The deoxidizing multilayered body according to claim 1, wherein the oxidizable thermoplastic resin is 1,4-polybutadiene, 1,2-polybutadiene, 1,4-polyisoprene, 3,4-polyisoprene, styrene butadiene rubber, a styrene-butadiene-styrene block copolymer, a styrene-isoprene-styrene block copolymer, an ethylene/methyl acrylate/cyclohexenyl methyl acrylate copolymer or a mixture thereof.

12. The deoxidizing multilayered body according to claim 1, wherein the oxidizable thermoplastic resin is 1,2-polybutadiene.

13. The deoxidizing multilayered body according to claim 12, wherein 1,2-polybutadiene is syndiotactic 1,2-polybutadiene.

* * * * *